(12) United States Patent
Xu et al.

(10) Patent No.: US 12,231,625 B2
(45) Date of Patent: Feb. 18, 2025

(54) RANGE CONSTRAINS FOR BLOCK VECTOR IN INTRA-BLOCK COPY MODE

(71) Applicants: Beijing Bytedance Network Technology Co., Ltd., Beijing (CN); Bytedance Inc., Los Angeles, CA (US)

(72) Inventors: Jizheng Xu, San Diego, CA (US); Li Zhang, San Diego, CA (US); Kai Zhang, San Diego, CA (US); Hongbin Liu, Beijing (CN)

(73) Assignees: BEIJING BYTEDANCE NETWORK TECHNOLGOY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 18/161,511

(22) Filed: Jan. 30, 2023

(65) Prior Publication Data

US 2023/0171400 A1 Jun. 1, 2023

Related U.S. Application Data

(63) Continuation of application No. 17/686,103, filed on Mar. 3, 2022, now Pat. No. 11,575,889, which is a (Continued)

(30) Foreign Application Priority Data

Sep. 5, 2019 (WO) .............. PCT/CN2019/104485

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/132* (2014.11); *H04N 19/176* (2014.11); *H04N 19/1883* (2014.11)

(58) Field of Classification Search
CPC .. H04N 19/105; H04N 19/132; H04N 19/174; H04N 19/176; H04N 19/186; H04N 19/1883; H04N 19/50; H04N 19/70
See application file for complete search history.

(56) References Cited

U.S. PATENT DOCUMENTS 9,860,559 B2 1/2018 Zhang
9,877,043 B2 1/2018 He
(Continued)

FOREIGN PATENT DOCUMENTS

CN 105765974 A 7/2016
CN 105847795 A 8/2016
(Continued)

OTHER PUBLICATIONS

Bross et al. "Versatile Video Coding (Draft 3)," Joint Video Experts Team (JVET) of ITU-T SG 16 WP 3 and ISO/IEC JTC 1/SC 29/WG 1112th Meeting: Macao, CN, Oct. 3-12, 2018, document JVET-L1001, 2018.
(Continued)

*Primary Examiner* — Anner N Holder
(74) *Attorney, Agent, or Firm* — Conley Rose, P.C.

(57) ABSTRACT

A method of video processing is described. The method includes performing a conversion between a current video block of a video picture of a video and a coded representation of the video according to a buffer allocation rule, wherein the conversion uses an intra block copy (IBC) mode in which a prediction of the current video block is derived based on sample values from a same video slice with the current video block, and wherein the sample values are
(Continued)

determined by block vectors, wherein the buffer allocation rule specifies that a virtual buffer allocated for the conversion using the IBC mode is greater than a minimum size of memory for storing a portion of the video picture searched for determining the block vectors.

20 Claims, 12 Drawing Sheets

Related U.S. Application Data continuation of application No. PCT/CN2020/113674, filed on Sep. 7, 2020.

(51) Int. Cl.
H04N 19/169 (2014.01)
H04N 19/176 (2014.01)

(56) References Cited

U.S. PATENT DOCUMENTS

| | | | |
|---|---|---|---|
| 10,178,403 | B2 | 1/2019 | Seregin |
| 10,284,874 | B2 | 5/2019 | He |
| 10,412,387 | B2 | 9/2019 | Pang |
| 10,516,882 | B2 | 12/2019 | He |
| 10,582,213 | B2 | 3/2020 | Li |
| 10,728,573 | B2 | 7/2020 | Sun |
| 11,006,130 | B2 | 5/2021 | Xiu |
| 11,533,507 | B2 | 12/2022 | Xu |
| 11,638,004 | B2 | 4/2023 | Xu |
| 11,683,476 | B2 | 6/2023 | Xu |
| 2005/0091358 | A1 | 4/2005 | Mehra |
| 2013/0094592 | A1 | 4/2013 | Zhou |
| 2015/0215621 | A1 | 7/2015 | Liu et al. |
| 2015/0264396 | A1 | 9/2015 | Zhang |
| 2016/0100189 | A1 | 4/2016 | Pang |
| 2016/0255344 | A1 | 9/2016 | Lee |
| 2017/0099490 | A1 | 4/2017 | Seregin et al. |
| 2017/0150176 | A1 | 5/2017 | Zhang |
| 2017/0230685 | A1 | 8/2017 | Gisquet |
| 2017/0289566 | A1 | 10/2017 | He |
| 2017/0295379 | A1 | 10/2017 | Sun |
| 2017/0347093 | A1 | 11/2017 | Yu |
| 2018/0091825 | A1 | 3/2018 | Zhao |
| 2018/0098079 | A1 | 4/2018 | Chuang |
| 2018/0146191 | A1 | 5/2018 | Jiang |
| 2019/0200038 | A1 | 6/2019 | He |
| 2019/0208217 | A1 | 7/2019 | Zhou |
| 2019/0238849 | A1 | 8/2019 | Fang |
| 2019/0246143 | A1 | 8/2019 | Zhang |
| 2020/0077087 | A1 | 3/2020 | He |
| 2020/0396465 | A1 | 12/2020 | Zhang |
| 2020/0404255 | A1 | 12/2020 | Zhang |
| 2020/0404260 | A1 | 12/2020 | Zhang |
| 2020/0413048 | A1 | 12/2020 | Zhang |
| 2021/0014504 | A1 | 1/2021 | Xu |
| 2021/0112243 | A1 | 4/2021 | Xu |
| 2021/0152833 | A1 | 5/2021 | Gao |
| 2021/0314560 | A1 | 10/2021 | Lai |
| 2021/0400304 | A1 | 12/2021 | Gao |
| 2022/0030223 | A1 | 1/2022 | Chen |
| 2022/0132105 | A1 | 4/2022 | Xu |
| 2022/0150476 | A1 | 5/2022 | Xu |
| 2022/0150540 | A1 | 5/2022 | Xu |
| 2022/0159246 | A1 | 5/2022 | Zhang |
| 2022/0166998 | A1 | 5/2022 | Lim |
| 2022/0182662 | A1 | 6/2022 | Kang |
| 2022/0191475 | A1 | 6/2022 | Xu |
| 2022/0224887 | A1 | 7/2022 | Xu |

FOREIGN PATENT DOCUMENTS

| | | |
|---|---|---|
| CN | 106464896 A | 2/2017 |
| CN | 106797466 A | 5/2017 |
| CN | 106797479 A | 5/2017 |
| CN | 107205149 A | 9/2017 |
| CN | 107211155 A | 9/2017 |
| CN | 107646195 A | 1/2018 |
| CN | 108012153 A | 5/2018 |
| CN | 108605143 A | 9/2018 |
| CN | 114503580 B | 8/2024 |
| EP | 3991423 A4 | 9/2022 |
| IN | 541903 A | 7/2020 |
| JP | 2017507554 A | 3/2017 |
| JP | 2017535150 A | 11/2017 |
| JP | 2022527362 A | 6/2022 |
| JP | 2022540184 A | 9/2022 |
| RU | 2669685 C2 | 10/2018 |
| WO | 2012152174 A1 | 11/2012 |
| WO | 2016138854 A1 | 9/2016 |
| WO | 2017157249 A1 | 9/2017 |
| WO | 2019125093 A1 | 6/2019 |
| WO | 2019143602 A1 | 7/2019 |
| WO | 2019147910 A1 | 8/2019 |
| WO | 2019150352 A1 | 8/2019 |
| WO | 2021013240 A1 | 1/2021 |

OTHER PUBLICATIONS

Bross et al. "Versatile Video Coding (Draft 6)," Joint Video Experts Team (JVET) of ITU-T SG 16 WP 3 and ISO/IEC JTC 1/SC 29/WG 11, 15th Meeting, Gothenburg, SE, Jul. 3-12, 2019, document JVET-O2001, 2019.

Chang et al. "AHG8: Support for Reference Picture Resampling—Handling of Resampling, TMVP, DMVR, and BDOF," Joint Video Experts Team (JVET) of ITU-T SG 16 WP 3 and ISO/IEC JTC 1/SC 29/WG 11 15th Meeting: Gothemburg, SE, Jul. 3-12, 2019, document JVET-O0134, 2019.

Chen et al. "Algorithm Description for Versatile Video Coding and Test Model 6 (VTM 6)," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O2002, 2019.

Gao et al. "Bitstream Conformance with a Virtual IBC Buffer Concept," Joint Video Experts Team (JVET) of ITU-T SG 16 WP 3 and ISO/IEC JTC 1/SC 29/WG 11, 15th Meeting, Gothenburg, SE, Jul. 3-12, 2019, document JVET-O1171, 2019.

Lu et al. "CE12: Mapping Functions (test CE12-1 and CE12-2)," Joint Video Experts Team (JVET) of ITU-T SG 16 Wp B and ISO/IEC JTC 1/SC 29/WG 11 13th Meeting: Marrakech, MA, Jan. 9-18, 2019, document JVET-M0427, 2019.

Luo et al. "CE2-Related: Prediction Refinement with Optical Flow for Affine Mode," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0236, 2019.

Xu et al. "CE8: CPR Reference Memory Reuse Without Increasing Memory Requirement (CE8.1.2a and CE8.1.2d)," Joint Video Experts Team (JVET) of ITU-T SG 16 WP 3 and ISO/IEC JTC 1/SC 29/WG 11 13th Meeting: Marrakesh, MA, Jan. 9-18, 2019, document JVET-M0407, 2019.

Xu et al. "CE8: CPR Reference Memory Reuse With Reduced Memory Requirement (CE8.1.2b and CE8.1.2c)," Joint Video Experts Team (JVET) of ITU-T SG 16 WP 3 and ISO/IEC JTC 1/SC 29/WG 11 13th Meeting: Marrakesh, MA, Jan. 9-18, 2019, document JVET-M0408, 2019.

Xu et al. "An Implementation of JVET-O0568 Based on the IBC Buffer Design of JVET-O0127," Joint Video Experts Team (JVET of ITU-T SG 16 WP 3 and ISO/IEC JTC 1/SC 29/WG 11 15th Meeting: Gothenburg, SE, Jul. 3-12, 2019, document JVET-O1161, 2019.

Xu et al. "Bitstream Conformance with a Virtual IBC Buffer Concept," Joint Video Experts Team (JVET) of ITU-T SG 16 WP 3 and ISO/IEC JTC 1/SC 29/WG 11, 15th Meeting, Gothenburg, SE, Jul. 3-12, 2019, document JVET-O1170, 2019.

Gao et al. ""CE8-Related: Dedicated IBC Reference Buffer without Bitstream Restrictions,"" Joint Video Experts Team (JVET) of

(56) References Cited

OTHER PUBLICATIONS

ITU-T SG 16 WP 3 and ISO/IEC JTC 1/SC 29/WG 11, 15th Meeting, Gothenburg, SE, Jul. 3-12, 2019, document JVET-O0248, 2019.
Li et al. "CE8-Related: IBC Modifications," Joint Video Experts Team (JVET) of ITU-T SG 16 WP 3 and ISO/IEC JTC1/SC 29/WG 11, 15th Meeting, Gothenburg, SE, Jul. 3-12, 2019, document JVET-O0127, 2019.
Tsang et al. ""Reduced-Complexity Intra Block Copy (IntraBC) Mode with Early CU Splitting and Pruning for HEVC Screen Content Coding,"" IEEE Transactions on Multimedia, Feb. 2019, 21(2):269-283.
Xu et al. ""Intra Block Copy in HEVC Screen Content Coding Extensions,"" IEEE Journal on Emerging and Selected Topics in Circuits and Systems, Dec. 2016, 6(4):409-419.
Xu et al. "Intra Block Copy in Versatile Video Coding with Reference Sample Memory Reuse," IEEE, Picture Coding Symposium, Ningbo China, Nov. 2019.
Xu et al. "Non-CE8: IBC Search Range Increase for Small CTU Size," Joint Video Experts Team (JVET) of ITU-T SG16 WP 3 and ISO/IEC JTC 1/SC 29/WG 11 14th Meeting, Geneva, CH, Mar. 19-27, 2019, document JVET-N0384. 2019.
Bross et al. "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N1001, 2019.
Document: JVET-Q2001-vE, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 512 pages.
Suehring, K., Retrieved from the internet: https://vcgit.hhi.fraunhofer.de/jvet/VVCSoftware_VTM/tags/VTM-8.0, Apr. 17, 2023, 2 pages.
Document: JVET-L0297-v1, Xu, X., et al., "CE8-related: CPR mode with local search range optimization," Joint Video Experts Team (JVET) of ITU-T SG 16 WP 3 and ISO/IEC JTC 1/SC 29/WG 11 12th Meeting: Macao, CN, Oct. 3-12, 2018, 6 pages.
ITU-T and ISO/IEC, "Information technology—High efficiency coding and media delivery in heterogeneous environments—Part 2: High efficiency video coding", ISO/IEC JTC 1/SC 29/WG 11 N17661, Rec. ITU-T H.265 | ISO/IEC 23008-2, Apr. 20, 2018, 8 pages.
Document: JVET-P1018-v2, "Non-CE8: An alternative IBC virtual buffer setting to avoid reference sample wrapping around," Joint Video Experts Team (JVET) of ITU-T SG 16 WP 3 and ISO/IEC JTC 1/SC 29/WG 11 16th Meeting: Geneva, CH, Oct. 1-11, 2019, 3 pages.
Document: JVET-N1002-v2, Chen, J., et al., "Algorithm description for Versatile Video Coding and Test Model 5 (VTM 5)," Joint Video Experts Team (JVET) of ITU-T SG 16 WP 3 and ISO/IEC JTC 1/SC 29/WG 11 14th Meeting: Geneva, CH, Mar. 19-27, 2019, 79 pages.
International Search Report and Written Opinion from International Patent Application No. PCT/CN2020/104081 dated Oct. 28, 2020 (11 pages).
International Search Report and Written Opinion from International Patent Application No. PCT/CN2020/104084 dated Oct. 28, 2020 (12 pages).
International Search Report and Written Opinion from International Patent Application No. PCT/CN2020/113674 dated Dec. 8, 2020 (9 pages).
International Search Report and Written Opinion from International Patent Application No. PCT/CN2020/116959 dated Dec. 14, 2020 (12 pages).
Non Final Office Action from U.S. Appl. No. 17/582,351 dated Apr. 12, 2022.
Non Final Office Action from U.S. Appl. No. 17/582,447 dated Apr. 20, 2022.
Extended European Search Report from European Patent No. 20844494.3 dated Aug. 2, 2022 (11 pages).
Extended European Search Report from European Patent No. 20844875.3 dated Aug. 9, 2022 (11 pages).
Examination Report from Indian Patent Application No. 202227004306 dated Jul. 13, 2022 (6 pages).
Non Final Office Action from U.S. Appl. No. 17/702,318 dated Jul. 26, 2022.
Notice of Allowance from U.S. Appl. No. 17/582,447 dated Aug. 3, 2022.
Final Office Action from U.S. Appl. No. 17/582,351 dated Aug. 16, 2022.
Extended European Search Report from European Patent No. 20869512.2 dated Oct. 14, 2022 (12 pages).
Foreign Communication From a Related Counterpart Application, PCT Application No. PCT/CN2021/081469, International Search Report dated Jun. 17, 2021, 13 pages.
Non-Final Office Action dated Jan. 24, 2023, 15 pages, U.S. Appl. No. 17/947,909, filed Sep. 19, 2022.
Office Action from Canadian Patent Application No. 3,148,207 dated Oct. 17, 2023, 6 pages.
Document: JVET-O0248-v1, Karabutov, A., et al., "CE8-related: Dedicated IBC reference buffer without bitstream restrictions," Joint Video Experts Team (JVET) of ITU-T SG 16 WP 3 and ISO/IEC JTC 1/SC 29/WG 11 15th Meeting: Gothenburg, SE, Jul. 3-12, 2019, 7 pages.
Document: JVET-O0070-CE4-2.1_WD_r3, Jiancong (Daniel) Luo et al, "CE4-2.1: Prediction refinement with optical flow for affine mode," Joint Video Experts Team (JVET) of ITU-T SG 16 WP 3 and ISO/IEC JTC 1/SC 29/ WG 11, 14th Meeting: Geneva, CH, Mar. 19-27, 2019, 21 pages.
Office Action from Chinese Patent Application No. 202080062746.9 dated Jun. 28, 2024 (46 pages).
Office Action from Chinese Patent Application No. 2020800669353 dated Apr. 10, 2024 (13 pages).
Document: JVET-N0472-v2, Xu, J., et al., "Non-CE8: On IBC reference buffer design," Joint Video Experts Team (JVET) of ITU-T SG 16 WP 3 and ISO/IEC JTC 1/SC 29/WG 11 14th Meeting: Geneva, CH, Mar. 19-27, 2019, 6 pages.
Non-Final Office Action from U.S. Appl. No. 18/296,655 dated Jul. 16, 2024, 36 pages.
Korean Notice of Allowance from Korean Patent Application No. 10-2022-7008788 dated Aug. 21, 2024, 8 pages.

500 —

502

Making a decision, based on a size of a virtual buffer associated with a current block that is coded based on pixels in a reference block, regarding a validity of a block vector or one or more samples mapped to the virtual buffer, a current picture comprising the current block and the reference block, and the size of the virtual buffer being based on a size of a virtual pipeline data unit, a size of a coding tree block size or a size of a coding tree unit

504

Performing, based on the decision, a conversion between the current block and a bitstream representation of the current block

520 — Designating, for a current block that is coded based on pixels in a reference block, one or more reference samples of the reference block as unavailable, each of the one or more reference samples being mapped to a virtual buffer and having a corresponding sample in at least a current virtual pipeline data unit associated with the reference block, and a current picture comprising the current block and the reference block 524 — Performing, based on the designating, a conversion between the current block and a bitstream representation of the current block

FIG. 5B

RANGE CONSTRAINS FOR BLOCK VECTOR IN INTRA-BLOCK COPY MODE

CROSS REFERENCE TO RELATED APPLICATIONS

This application is a continuation application of U.S. application Ser. No. 17/686,103 filed on Mar. 3, 2022, which is a continuation of International Patent Application No. PCT/CN2020/113674, filed on Sep. 7, 2020, which claims the priority to and benefit of International Patent Application No. PCT/CN2019/104485, filed on Sep. 5, 2019. All the aforementioned patent applications are hereby incorporated by reference in their entireties.

TECHNICAL FIELD

This patent document relates to video coding and decoding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video processing, and specifically, to general virtual buffers for intra block copy (IBC). The described methods may be applied to both the existing video coding standards (e.g., High Efficiency Video Coding (HEVC)) and future video coding standards or video codecs.

In one representative aspect, the disclosed technology may be used to provide a method for video processing. This method includes performing a conversion between a current video block of a video picture of a video and a coded representation of the video according to a buffer allocation rule, wherein the conversion uses an intra block copy (IBC) mode in which a prediction of the current video block is derived based on sample values from a same video slice with the current video block, and wherein the sample values are determined by block vectors; wherein the buffer allocation rule specifies that a virtual buffer allocated for the conversion using the IBC mode is greater than a minimum size of memory for storing a portion of the video picture searched for determining the block vectors.

In another example aspect, a method of video processing is disclosed. The method includes determining, for a conversion between a current video block of a current picture of a video and a coded representation of the video, a prediction block for the current video block from a reference block according to a position rule; and performing the conversion based on the determining; wherein the position rule specifies an allowable position of the reference block with respect to a virtual pipeline data unit (VPDU) row or a VPDU column of the current picture.

In yet another aspect, another method of video processing is disclosed. The method includes determining, for a conversion between a current video block of a video picture of a video and a coded representation of the video, a range of a block vector and/or a block vector difference that is used for predicting the current video block according to a rule; and performing the conversion based on the decision, wherein the block vector indicates a displacement between the current video block and a reference region in the video picture used for predictively coding the current video block.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIGS. 5A, 5B and 5C show flowcharts of example methods for video processing.

DETAILED DESCRIPTION

Figure 1:
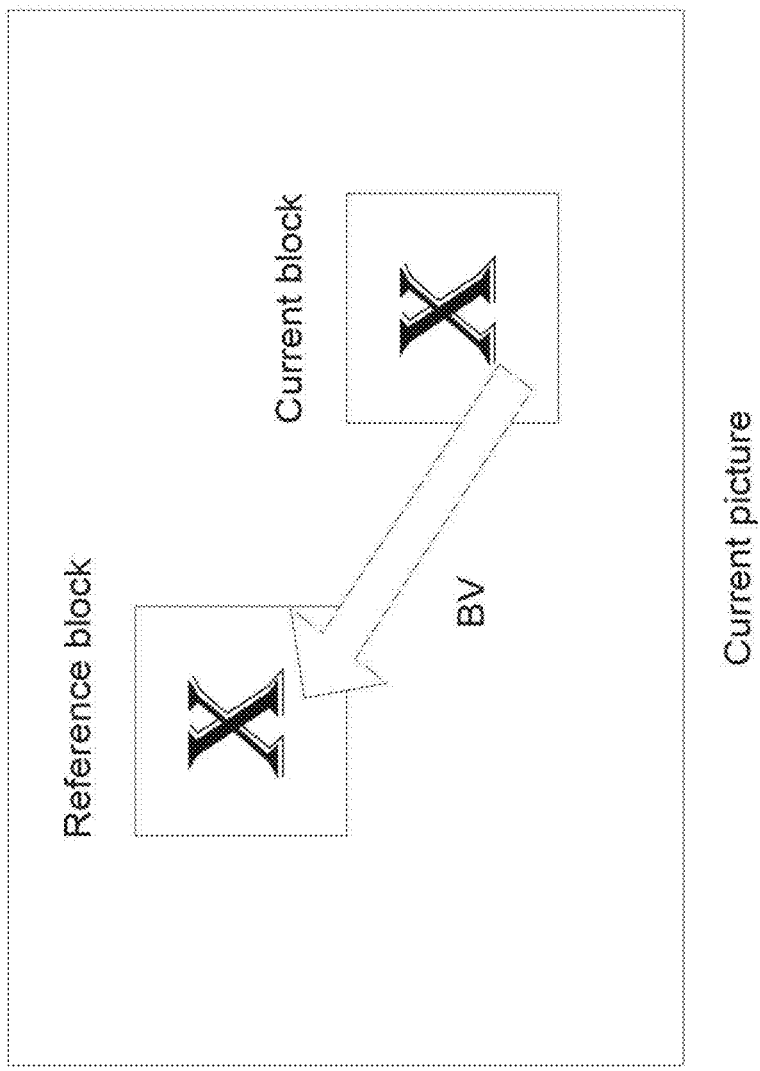
FIG. 1 shows an example of current picture referencing.

Embodiments of the disclosed technology may be applied to existing video coding standards (e.g., HEVC, H.265) and future standards to improve compression performance. Section headings are used in the present document to improve readability of the description and do not in any way limit the discussion or the embodiments (and/or implementations) to the respective sections only.

2 Video Coding Introduction

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or Moving Picture Experts Group (MPEG)-H Part 2), the Versatile Video Coding standard to be finalized, or other current and/or future video coding standards.

Video coding standards have evolved primarily through the development of the well-known International Telecommunication Union-Telecommunication Standardization Sector (ITU-T) and International Organization for Standardization (ISO)/International Electrotechnical Commission (IEC) standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by Video Coding Experts Group (*VCEG*) *and MPEG jointly in* 2015. Since then, many new methods have been adopted by JVET and put into the reference software named Joint Exploration Model (JEM) [3][4]. In April 2018, the Joint Video Expert Team (JVET) between VCEG (Q6/16) and ISO/IEC Joint Technical Committee (JTC)1 Standardization Committee (SC)29/Working Group (WG)11 (MPEG) was created to work on the Versatile Video Coding (VVC) standard targeting at 50% bitrate reduction compared to HEVC.

2.1 Inter Prediction in HEVC/H.265

Each inter-predicted prediction unit (PU) has motion parameters for one or two reference picture lists. Motion parameters include a motion vector and a reference picture index. Usage of one of the two reference picture lists may also be signaled using inter_pred_idc. Motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighboring PUs, including spatial and temporal candidates. The merge mode can be applied to any inter-predicted PU, not only for skip mode. The alternative to merge mode is the explicit transmission of motion parameters, where motion vector (to be more precise, motion vector differences (MVD) compared to a motion vector predictor), corresponding reference picture index for each reference picture list and reference picture list usage are signaled explicitly per each PU. Such a mode is named Advanced motion vector prediction (AMVP) in this disclosure.

When signaling indicates that one of the two reference picture lists is to be used, the PU is produced from one block of samples. This is referred to as 'uni-prediction'. Uni-prediction is available both for P-slices and B-slices.

When signaling indicates that both of the reference picture lists are to be used, the PU is produced from two blocks of samples. This is referred to as 'bi-prediction'. Bi-prediction is available for B-slices only.

The following text provides the details on the inter prediction modes specified in HEVC. The description will start with the merge mode.

2.2 Current Picture Referencing

Current Picture Referencing (CPR), or once named as Intra Block Copy (IBC) has been adopted in HEVC Screen Content Coding extensions (HEVC-SCC) and the current VVC test model (VTM-3.0). IBC extends the concept of motion compensation from inter-frame coding to intra-frame coding. As demonstrated in FIG. 1, the current block is predicted by a reference block in the same picture when CPR is applied. The samples in the reference block must have been already reconstructed before the current block is coded or decoded. Although CPR is not so efficient for most camera-captured sequences, it shows significant coding gains for screen content. The reason is that there are lots of repeating patterns, such as icons and text characters in a screen content picture. CPR can remove the redundancy between these repeating patterns effectively. In HEVC-SCC, an inter-coded coding unit (CU) can apply CPR if it chooses the current picture as its reference picture. The MV is renamed as block vector (BV) in this case, and a BV always has an integer-pixel precision. To be compatible with main profile HEVC, the current picture is marked as a "long-term" reference picture in the Decoded Picture Buffer (DPB). It should be noted that similarly, in multiple view/3D video coding standards, the inter-view reference picture is also marked as a "long-term" reference picture.

Following a BV to find its reference block, the prediction can be generated by copying the reference block. The residual can be got by subtracting the reference pixels from the original signals. Then transform and quantization can be applied as in other coding modes.

However, when a reference block is outside of the picture, or overlaps with the current block, or outside of the reconstructed area, or outside of the valid area restricted by some constraints, part or all pixel values are not defined. Basically, there are two solutions to handle such a problem. One is to disallow such a situation, e.g. in bitstream conformance. The other is to apply padding for those undefined pixel values. The following sub-sessions describe the solutions in detail.

2.3 CPR in HEVC Screen Content Coding Extensions

In the screen content coding extensions of HEVC, when a block uses current picture as reference, it should guarantee that the whole reference block is within the available reconstructed area, as indicated in the following spec text:

The variables offsetX and offsetY are derived as follows:

$$\text{offsetX}=(\text{ChromaArrayType}==0)?0:(\text{mvCLX}[0]\ \&0x7?2:0) \quad (8\text{-}104)$$

$$\text{offsetY}=(\text{ChromaArrayType}==0)?0:(\text{mvCLX}[1]\ \&0x7?2:0) \quad (8\text{-}105)$$

It is a requirement of bitstream conformance that when the reference picture is the current picture, the luma motion vector mvLX shall obey the following constraints:

When the derivation process for z-scan order block availability as specified in clause 6.4.1 is invoked with (xCurr, yCurr) set equal to (xCb, yCb) and the neighbouring luma location (xNbY, yNbY) set equal to (xPb+(mvLX[0]>>2)−offsetX, yPb+(mvLX[1]>>2)−offsetY) as inputs, the output shall be equal to TRUE.

When the derivation process for z-scan order block availability as specified in clause 6.4.1 is invoked with (xCurr, yCurr) set equal to (xCb, yCb) and the neighbouring luma location (xNbY, yNbY) set equal to (xPb+(mvLX[0]>>2)+nPbW−1+offsetX, yPb+(mvLX[1]>>2)+nPbH−1+offsetY) as inputs, the output shall be equal to TRUE.

One or both of the following conditions shall be true:

The value of (mvLX[0]>>2)+nPbW+xB1+offsetX is less than or equal to 0.

The value of (mvLX[1]>>2)+nPbH+yB1+offsetY is less than or equal to 0.

The following condition shall be true:

$$(xPb+(mvLX[0]>>2)+nPbSw-1+offsetX)/CtbSizeY-\\ xCb/CtbSizeY<=yCb/CtbSizeY-(yPb+(mvLX\\ [1]>>2)+nPbSh-1+offsetY)/CtbSizeY \quad (8\text{-}106)$$

Thus, the case that the reference block overlaps with the current block or the reference block is outside of the picture will not happen. There is no need to pad the reference or prediction block.

2.4 CPR/IBC in VVC Test Model

In the current VVC test model, i.e. VTM-3.0 design, the whole reference block should be with the current coding tree unit (CTU) and does not overlap with the current block. Thus, there is no need to pad the reference or prediction block.

When dual tree is enabled, the partition structure may be different from luma to chroma CTUs. Therefore, for the 4:2:0 colour format, one chroma block (e.g., CU) may correspond to one collocated luma region which have been split to multiple luma CUs.

The chroma block could only be coded with the CPR mode when the following conditions shall be true:
  (1) each of the luma CU within the collocated luma block shall be coded with CPR mode
  (2) each of the luma 4×4 block' BV is firstly converted to a chroma block's BV and the chroma block's BV is a valid BV.

If any of the two condition is false, the chroma block shall not be coded with CPR mode.

It is noted that the definition of 'valid BV' has the following constraints:
  (1) all samples within the reference block identified by a BV shall be within the restricted search range (e.g., shall be within the same CTU in current VVC design).
  (2) all samples within the reference block identified by a BV have been reconstructed.

2.5 CPR/IBC in JVET-L0297/JVET-M0407/JVET-M0408

In VTM3.0, the reference area for CPR/IBC is restricted to the current CTU, which is up to 128×128. JVET-L0297/JVET-M0407/JVET-M0408 present methods to dynamically change the reference area to reuse memory to store reference samples for CPR/IBC so that a CPR/IBC block can have more reference candidate while the reference buffer for CPR/IBC can be kept or reduced from one CTU.

Figure 2:
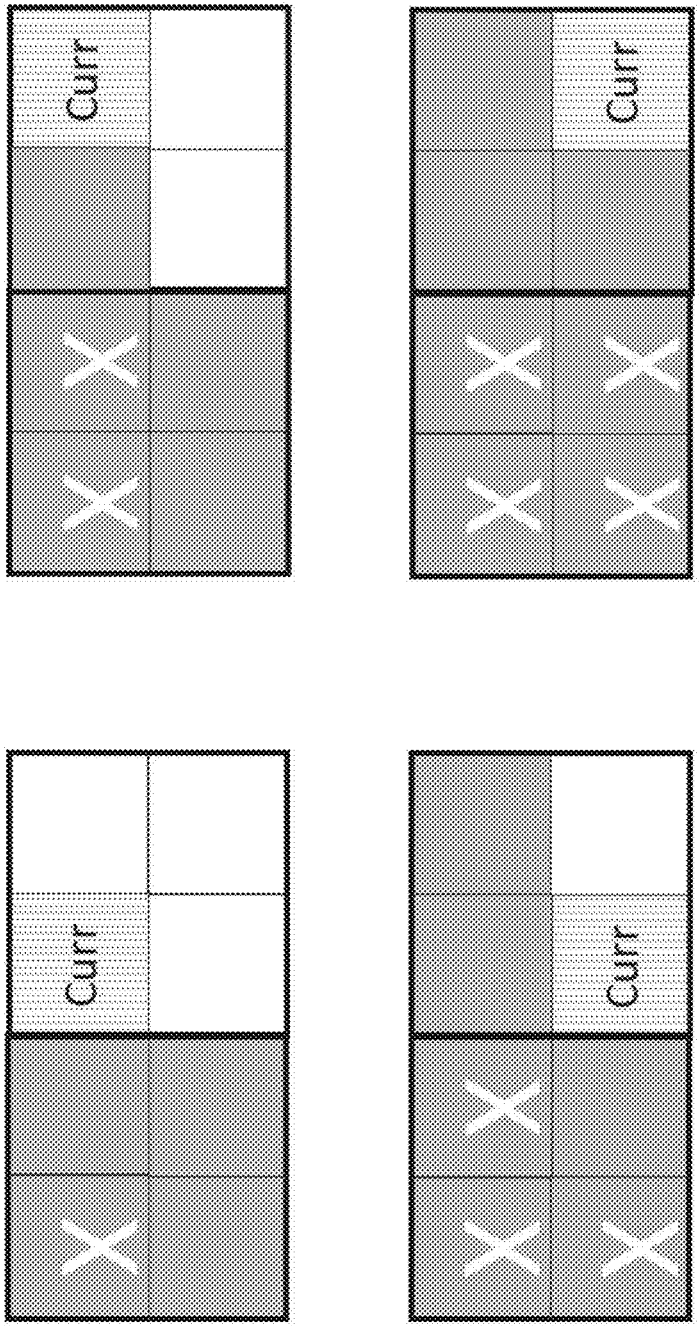
FIG. 2 shows an example a dynamic reference area in JVET-M0407.

FIG. 2 shows a method, where a block is of 64×64 and a CTU contains 4 64×64 blocks. When coding a 64×64 blocks, previous 3 64×64 blocks can be used as reference. By doing so, a decoder just needs to store 4 64×64 blocks to support CPR/IBC. The above method was adopted into VTM4.0.

Suppose that the current luma CU's position relative to the upper-left corner of the picture is (x, y) and block vector is (BVx, BVy). In the current design, if the BV is valid can be told by that the luma position ((x+BVx)>>6<<6+(1<<7), (y+BVy)>>6<<6) has not been reconstructed and ((x+BVx)>>6<<6+(1<<7), (y+BVy)>>6<<6) is not equal to (x>>6<<6, y>>6<<6).

2.6 Virtual IBC buffer proposed in JVET-O1170

A virtual buffer concept is introduced to help describing the reference region for IBC prediction mode. For CTU size being ctbSize, we denote wIbcBuf=128*128/ctbSize and define a virtual IBC buffer, ibcBuf, with width being wIbcBuf and height being ctbSize. Thus, For CTU size being 128×128, the size of ibcBuf is also 128×128.
For CTU size being 64×64, the size of ibcBuf is 256×64.
For CTU size being 32×32, the size of ibcBuf is 512×32.

It is noted that VPDU width and height are min(ctbSize, 64). We denote Wv=min(ctbSize, 64).

The virtual IBC buffer, ibcBuf is maintained as follows.
  (1) At the beginning of decoding each CTU row, refresh the whole ibcBuf with value (−1).
  (2) At the beginning of decoding a VPDU (xVPDU, yVPDU) relative to the top-left corner of the picture, set the ibcBuf[x][y]=−1, with x=xVPDU % wIbcBuf, . . . , xVPDU % wIbcBuf+Wv−1; y=yVPDU % ctbSize, . . . , yVPDU % ctbSize+Wv−1.
  (3) After decoding a CU contains (x, y) relative to the top-left of the picture, set
  ibcBuf[x % wIbcBuf][y % ctbSize]=recSample[x][y]

So a bitstream constraint can be simply described as

It is a requirement of bitstream conformance that for a by, ibcBuf[(x+bv[0]) % wIbcBufl][(y+bv[1]) % ctbSize] shall not be equal to −1.

With the concept of IBC reference buffer, it also simplifies the text for the decoding process by avoid reference to the inter interpolation and motion compensation process, including subblock process.

2.7 VPDU

Virtual pipeline data units (VPDUs) are defined as non-overlapping units in a picture. In hardware decoders, successive VPDUs are processed by multiple pipeline stages at the same time. The VPDU size is roughly proportional to the buffer size in most pipeline stages, so it is important to keep the VPDU size small. In most hardware decoders, the VPDU size can be set to maximum transform block (TB) size. However, in VVC, ternary tree (TT) and binary tree (BT) partition may lead to the increasing of VPDUs size.

In order to keep the VPDU size as 64×64 luma samples, the following normative partition restrictions (with syntax signaling modification) are applied in VTM5:
  TT split is not allowed for a CU with either width or height, or both width and height equal to 128.
  For a 128×N CU with N≤64 (i.e. width equal to 128 and height smaller than 128), horizontal BT is not allowed.
  For an N×128 CU with N≤64 (i.e. height equal to 128 and width smaller than 128), vertical BT is not allowed.

In VVC, generally it is agreed that the width and height of a VPDU is min(64, CtbSizeY) in luma samples. So for CTB/CTU size being 64×64, 128×128 or 256×256, VPDU size is 64×64. For CTB/CTU size being 32×32, VPDU size is 32×32.

2.8 Buffer Management and Block Vector Coding for Intra Block Copy

Various IBC buffer features and details for its corresponding management are described in PCT/CN2019/093552, which is incorporated by reference.

2.9 in-Loop Reshaping (ILR) in JVET-M0427

The basic idea of in-loop reshaping (ILR) is to convert the original (in the first domain) signal (prediction/reconstruction signal) to a second domain (reshaped domain).

The in-loop luma reshaper is implemented as a pair of look-up tables (LUTs), but only one of the two LUTs need to be signaled as the other one can be computed from the signaled LUT. Each LUT is a one-dimensional, 10-bit, 1024-entry mapping table (1D-LUT). One LUT is a forward LUT, FwdLUT, that maps input luma code values $Y_i$ to altered values $Y_r$: $Y_r$=FwdLUT[$Y_i$]. The other LUT is an inverse LUT, InvLUT, that maps altered code values $Y_r$ to $\hat{Y}_i$: $\hat{Y}_i$=InvLUT[$Y_r$]. ($\hat{Y}_i$ represents the reconstruction values of $Y_i$.).

2.9.1 PWL Model

Conceptually, piece-wise linear (PWL) is implemented in the following way:

Let x1, x2 be two input pivot points, and y1, y2 be their corresponding output pivot points for one piece. The output value y for any input value x between x1 and x2 can be interpolated by the following equation:

$$y=((y2-y1)/(x2-x1))*(x-x1)+y1$$

In fixed point implementation, the equation can be rewritten as:

$$y=((m*x+2^{FP\_PREC-1})>>FP\_PREC)+c$$

Herein, m is scalar, c is an offset, and FP_PREC is a constant value to specify the precision.

Note that in CE-12 software, the PWL model is used to precompute the 1024-entry FwdLUT and InvLUT mapping tables; but the PWL model also allows implementations to calculate identical mapping values on-the-fly without precomputing the LUTs.

2.9.2 Test CE12-2
2.9.2.1 Luma Reshaping

Test 2 of the in-loop luma reshaping (i.e., CE12-2 in the proposal) provides a lower complexity pipeline that also eliminates decoding latency for block-wise intra prediction in inter slice reconstruction. Intra prediction is performed in reshaped domain for both inter and intra slices.

Figure 3:
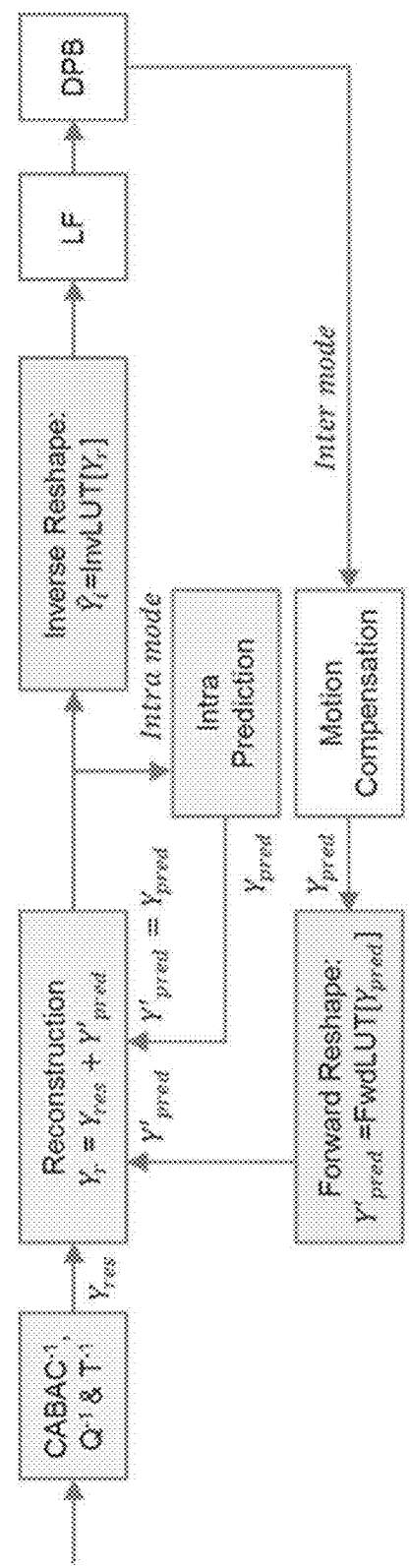
FIG. 3 shows a flowchart of a decoding flow with reshaping.

Intra prediction is always performed in reshaped domain regardless of slice type. With such arrangement, intra prediction can start immediately after previous TU reconstruction is done. Such arrangement can also provide a unified process for intra mode instead of being slice dependent. FIG. 3 shows the block diagram of the CE12-2 decoding process based on mode.

CE12-2 also tests 16-piece piece-wise linear (PWL) models for luma and chroma residue scaling instead of the 32-piece PWL models of CE12-1.

Inter slice reconstruction with in-loop luma reshaper in CE12-2 (lighter shaded blocks indicate signal in reshaped domain: luma residue; intra luma predicted; and intra luma reconstructed)

2.9.2.2 Luma-Dependent Chroma Residue Scaling

Luma-dependent chroma residue scaling is a multiplicative process implemented with fixed-point integer operation. Chroma residue scaling compensates for luma signal interaction with the chroma signal. Chroma residue scaling is applied at the TU level. More specifically, the following applies:

For intra, the reconstructed luma is averaged.
For inter, the prediction luma is averaged.

The average is used to identify an index in a PWL model. The index identifies a scaling factor cScaleInv. The chroma residual is multiplied by that number.

It is noted that the chroma scaling factor is calculated from forward-mapped predicted luma values rather than reconstructed luma values.

2.9.2.3 Signaling of ILR Side Information

The parameters are (currently) sent in the tile group header (similar to adaptive loop filter (ALF)). These reportedly take 40-100 bits.

The following spec is based on version 9 of JVET-L1001. The added syntax is prefixed with "++".

In 7.3.2.1 Sequence parameter set Raw Byte Sequence Payload (RBSP) syntax

|  | Descriptor |
|---|---|
| seq_parameter_set_rbsp( ) { |  |
|   sps_seq_parameter_set_id | ue(v) |
|   ... |  |
|   sps_triangle_enabled_flag | u(1) |
|   sps_ladf_enabled_flag | u(1) |
|   if ( sps_ladf_enabled_flag ) { |  |
|     sps_num_ladf_intervals_minus2 | u(2) |
|     sps_ladf_lowest_interval_qp_offset | se(v) |

-continued

|  | Descriptor |
|---|---|
|     for( i = 0; i < sps_num_ladf_intervals_minus2 + 1; i++ ) |  |
|     { |  |
|       sps_ladf_qp_offset[ i ] | se(v) |
|       sps_ladf_delta_threshold_minus1[ i ] | ue(v) |
|     } |  |
|   } |  |
| ++ sps_reshaper_enabled_flag | u(1) |
|   rbsp_trailing_bits( ) |  |
| } |  |

In 7.3.3.1 General tile group header syntax

|  | Descriptor |
|---|---|
| tile_group_header( ) { |  |
| ... |  |
|   if( num_tiles_in_tile_group_minus1 > 0 ) { |  |
|     offset_len_minus1 | ue(v) |
|     for( i = 0; i < num_tiles_in_tile_group_minus1; i++ ) |  |
|       entry_point_offset_minus1[ i ] | u(v) |
|   } |  |
| ++ if ( sps_reshaper_enabled_flag ) { |  |
| ++   tile_group_reshaper_model_present_flag | u(1) |
| ++   if ( tile_group_reshaper_model_present_flag ) |  |
| ++     tile_group_reshaper_model ( ) |  |
| ++   tile_group_reshaper_enable_flag | u(1) |
| ++   if ( tile_group_reshaper_enable_flag && (!( qtbtt_dual_tree_intra_flag && tile_group_type == I ) ) ) |  |
| ++     tile_group_reshaper_chroma_residual_scale_flag | u(1) |
| ++ } |  |
|   byte_alignment( ) |  |
| } |  |

Add a new syntax table tile group reshaper model:

|  | Descriptor |
|---|---|
| ++tile_group_reshaper_model ( ) { |  |
| ++   reshaper_model_min_bin_idx | ue(v) |
| ++   reshaper_model_delta_max_bin_idx | ue(v) |
| ++   reshaper_model_bin_delta_abs_cw_prec_minus1 | ue(v) |
| ++   for( i = reshaper_model_min_bin_idx; i <= reshaper_model_max_bin_idx; i++ ) { |  |
| ++     reshape_model_bin_delta_abs_CW [ i ] | u(v) |
| ++     if ( reshaper_model_bin_delta_abs_CW[ i ] ) > 0 ) |  |
| ++       reshaper_model_bin_delta_sign_CW_flag[ i ] | u(1) |
| ++   } |  |
| ++} |  |

++In General sequence parameter set RBSP semantics, add the following semantics:

sps_reshaper_enabled_flag equal to 1 specifies that reshaper is used in the coded video sequence (CVS).

sps_reshaper_enabled_flag equal to 0 specifies that reshaper is not used in the CVS.

++In tile group header syntax, add the following semantics tile_group_reshaper_model_present_flag equal to 1 specifies tile_group_reshaper_model( ) is present in tile group header. tile_group_reshaper_model_present_flag equal to 0 specifies tile_group_reshaper_model( ) is not present in tile group header. When tile_group_reshaper_model_present_flag is not present, it is inferred to be equal to 0.

tile_group_reshaper_enabled_flag equal to 1 specifies that reshaper is enabled for the current tile group.

tile_group_reshaper_enabled_flag equal to 0 specifies that reshaper is not enabled for the current tile group. When tile_group_reshaper_enable_flag is not present, it is inferred to be equal to 0.

tile_group_reshaper_chroma_residual_scale_flag equal to 1 specifies that chroma residual scaling is enabled for the current tile group. tile_group_reshaper_chroma_residual_scale_flag equal to 0 specifies that chroma residual scaling is not enabled for the current tile group. When tile_group_reshaper_chroma_residual_scale_flag is not present, it is inferred to be equal to 0.

++Add tile_group_reshaper_model( ) syntax reshape_model_min_bin_idx specifies the minimum bin (or piece) index to be used in the reshaper construction process. The value of reshape_model_min_bin_idx shall be in the range of 0 to MaxBinIdx, inclusive. The value of MaxBinIdx shall be equal to 15.

reshape_model_delta_max_bin_idx specifies the maximum allowed bin (or piece) index MaxBinIdx minus the maximum bin index to be used in the reshaper construction process. The value of reshape_model_max_bin_idx is set equal to MaxBinIdx—reshape_model_delta_max_bin_idx.

reshaper_model_bin_delta_abs_cw_prec_minus1 plus 1 specifies the number of bits used for the representation of the syntax reshape_model_bin_delta_abs_CW[i].

reshape_model_bin_delta_abs_CW[i] specifies the absolute delta codeword value for the ith bin.

reshaper_model_bin_delta_sign_CW_flag[i] specifies the sign of reshape_model_bin_delta_abs_CW[i] as follows:
  If reshape_model_bin_delta_sign_CW_flag[i] is equal to 0, the corresponding variable RspDeltaCW[i] is a positive value.
  Otherwise (reshape_model_bin_delta_sign_CW_flag[i] is not equal to 0), the corresponding variable RspDeltaCW[i] is a negative value.

When reshape_model_bin_delta_sign_CW_flag[i] is not present, it is inferred to be equal to 0.

The variable RspDeltaCW[1] (1 2*reshape_model_bin_delta_sign_CW [i])*reshape_model_bin_delta_abs_CW [i];

The variable RspCW[i] is derived as following steps:

The variable OrgCW is set equal to (1<<BitDepth$_Y$)/(MaxBinIdx+1).

If reshaper_model_min_bin_idx<=i<=reshaper_model_max_bin_idx
  RspCW[i]=OrgCW+RspDeltaCW[i].
  Otherwise, RspCW[i]=0.

The value of RspCW [i] shall be in the range of 32 to 2*OrgCW−1 if the value of BitDepth$_Y$ is equal to 10.

The variables InputPivot[i] with i in the range of 0 to MaxBinIdx+1, inclusive are derived as follows InputPivot[i]=i*OrgCW The variable ReshapePivot[i] with i in the range of 0 to MaxBinIdx+1, inclusive, the variable ScaleCoef[i] and InvScaleCoeff[i] with i in the range of 0 to MaxBinIdx, inclusive, are derived as follows:

```
shiftY = 14
ReshapePivot[ 0 ] = 0;
for( i = 0; i <= MaxBinIdx ; i++) {
ReshapePivot[ i + 1 ] = ReshapePivot[ i ] + RspCW[ i ]
ScaleCoef[ i ] = ( RspCW[ i ] * (1 << shiftY) + (1 << (Log2(OrgCW) −
1))) >> (Log2(OrgCW))
    if ( RspCW[ i ] == 0 )
    InvScaleCoeff[ i ] = 0
    else
    InvScaleCoeff[ i ] = OrgCW * (1 << shiftY) / RspCW[ i ]
}
```

The variable ChromaScaleCoef[i] with i in the range of 0 to MaxBinIdx, inclusive, are derived as follows:

ChromaResidualScaleLut[64]={16384, 16384, 16384, 16384, 16384, 16384, 16384, 8192, 8192, 8192, 8192, 5461, 5461, 5461, 5461, 4096, 4096, 4096, 4096, 3277, 3277, 3277, 3277, 2731, 2731, 2731, 2731, 2341, 2341, 2341, 2048, 2048, 2048, 1820, 1820, 1820, 1638, 1638, 1638, 1638, 1489, 1489, 1489, 1489, 1365, 1365, 1365, 1365, 1260, 1260, 1260, 1260, 1170, 1170, 1170, 1170, 1092, 1092, 1092, 1092, 1024, 1024, 1024, 1024};

shiftC=11 if (RspCW[ i]==0)
    ChromaScaleCoef[i]=(1<<shiftC)
  Otherwise (RspCW[i]!=0), ChromaScaleCoef[i]=ChromaResidualScaleLut[RspCW[i]>>1]

2.9.2.4 Usage of ILR

At the encoder side, each picture (or tile group) is firstly converted to the reshaped domain. And all the coding process is performed in the reshaped domain. For intra prediction, the neighboring block is in the reshaped domain; for inter prediction, the reference blocks (generated from the original domain from decoded picture buffer) are firstly converted to the reshaped domain. Then the residual are generated and coded to the bitstream.

After the whole picture (or tile group) finishes encoding/decoding, samples in the reshaped domain are converted to the original domain, then deblocking filter and other filters are applied.

Forward reshaping to the prediction signal is disabled for the following cases:
  Current block is intra-coded
  Current block is coded as CPR (current picture referencing, aka intra block copy, IBC)
  Current block is coded as combined inter-intra mode (CIIP) and the forward reshaping is disabled for the intra prediction block 3 Drawbacks of Existing Implementations In the current design of IBC virtual buffer, some problems exist.
  (1) How to maintain IBC virtual buffer when CTU size is larger than 128×128 is not defined.
  (2) The relationship between virtual buffer size and size of reference samples is not clear.

4 Example Methods for General Virtual Buffers for IBC

Denote the width and height of a VPDU by vSize, e.g., vSize=min(64, ctbSizeY), where ctbSizeY is the luma CTB/CTU width/height.

Embodiments of the presently disclosed technology overcome the drawbacks of existing implementations, thereby providing video coding with higher coding efficiencies. The methods for general virtual buffers for IBC, based on the disclosed technology, may enhance both existing and future video coding standards, is elucidated in the following examples described for various implementations. The examples of the disclosed technology provided below explain general concepts, and are not meant to be interpreted as limiting. In an example, unless explicitly indicated to the contrary, the various features described in these examples may be combined.
1. The size of IBC virtual buffer (e.g., which is used to decide whether a block vector or a mapped sample's validity) may depend on VPDU size, CTB/CTU size.
    a. In one example, the width times height of the virtual buffer may be fixed, however, the width and/height of the virtual buffer may depend on VPDU size and/or CTB/CTU size.
    b. In one example, the height of the virtual buffer may be equal to the height of CTB/CTU.
        i. Alternatively, furthermore, the the width of the virtual buffer may be set to (IBC virtual buffer size/height of CTB).
    c. In one example, the width of the virtual buffer may be equal to the width of CTB/CTU.
    d. In one example, the width of the virtual buffer may be one or multiple times of VPDU width
    e. In one example, the height of the virtual buffer may be one or multiple times of VPDU height
2. It is proposed to allocate a larger IBC virtual buffer size compared to the required memory size for IBC BV searching area.
    a. In one example, the IBC virtual buffer size may be larger than the total size of VPDU memory used for IBC.
        i. In one example, one more CTU may be allocated to IBC virtual buffer.
    b. In one example, the width of the IBC virtual buffer size may be (128*128/ctbSizeY+ctbSizeY).
    c. In one example, the width of the IBC virtual buffer size may be (128*128/ctbSizeY+ctbSizeY) and the height of the IBC virtual buffer size may be ctbSizeY.
3. The reference block for an IBC block may be constrained to be fully within a certain VPDU row or VPDU column
    a. In one example, the reference block may be disallowed to cross different VPDU rows.
    b. In one example, the reference block may be disallowed to cross different VPDU columns.
    c. In one example, the above VPDU row or column may be relative to the picture.
    d. In one example, the above VPDU row or column may be relative to the IBC virtual buffer.
    e. Alternatively, furthermore, the above methods may be invoked when the reference block pointed by a BV cross two or more CTUs/CTBs.
4. The reference block for an IBC block may cross multiple VPDUs/cross different VPDU rows/VPDU columns. However, additional operations may be required to fill in some prediction values in the reference block.
    a. In one example, some default values may be utilized to fill in some prediction values.
5. A range constraint may be applied to block vectors (BVs) and/or block vector differences (BVD) used in IBC mode.
    a. In one example, the allowed range of BV/BVDs may depend on the location of current IBC coded block, such as coordinators relative to the CTU/CTB covering current block.
    b. In one example, block vectors may be constrained in the range of $[-2^m, 2^m-1]$.
    c. In one example, block vector differences after precision conversion may be constrained in the range of $[-2^n, 2^n-1]$
    d. In one example, block vector differences after precision conversion may be constrained in the range of $[-2^n+1, 2^{nm}-1]$
    e. In one example, block vector differences signalled in the bitstreams may be constrained in the range of $[-2^n, 2^n-1]$
    f. In one example, block vector differences signalled in the bitstreams may be constrained in the range of $[-2^n+1, 2^n-1]$
    g. In one example, m is set to 18 or 17 or 15.
    h. In one example, n is set to 17 or 16 or 14.
    i. In one example, m and/or n may depend on the precision for BV/motion vector storage and/or the precision associated with the block vector differences.
    j. In one example, block vectors may be constrained in the same range as motion vectors used for inter prediction mode.
    k. In one example, block vector differences may be constrained in the same range as motion vector vectors used for inter prediction mode.
    l. In one example, a conformance bitstream shall satisfy that the above sub-bullet is satisfied.
        i. Alternatively, a clipping process to the BV/BVD may be applied to decoded BV/BVD before BV/BVDs are utilized to encode/decode a block.
6. The number of available samples mapped to the IBC virtual buffer may be restricted.
    a. In one example, the maximum number of available samples mapped to the buffer may be smaller than the IBC virtual buffer size.
    b. In one example, the maximum number of available samples mapped to the IBC virtual buffer may be fixed when CTB/CTU size is larger than 64×64.
    c. In one example, the number of available samples mapped to the IBC virtual buffer may be restricted to be smaller or equal to one or multiple times of number of samples in a VPDU.
        i. In one example, the number of available samples mapped to the IBC virtual buffer may be restricted to be smaller or equal to three times of number of samples in a VPDU when CTU/CTB size is larger than 64×64.
7. The unavailability marking for IBC reference samples mapped to the IBC virtual buffer may be performed in the granularity of VPDU
    a. In one example, when samples are needed to be marked as unavailable, samples within the same VPDU may also be marked as unavailable.
    b. In one example, one or multiple VPDUs may be marked as unavailable simultaneously.
    c. In one example, which VPDU's samples are marked to unavailable may depend on the position of the current VPDU.
    d. In one example, which VPDU's samples are marked to unavailable may depend on the position of the previous or most recently decoded VPDU.
8. When CTU/CTB size is larger than 64×64, IBC reference may be the current VPDU and the three most recently decoded VPDUs.
    a. In one example, an index may be maintained for each VPDU mapped to the virtual IBC buffer to track the decoding order of each VPDU.

9. A counter may be maintained to track the number of available VPDUs mapped to the buffer.
   a. In one example, the counter is reset to 0 at beginning of decoding each CTU row and increased by one when one VPDU mapped to the buffer has been decoded.
   b. In one example, when the counter is larger than a certain value, e.g. 3, one VPDU's samples mapped to the buffer may be marked as unavailable and the counter may be decreased by 1.
10. When CTU/CTB size is 128×128, the corresponding IBC virtual buffer may be of size 256×128.
    a. Alternatively, the IBC virtual buffer may be of size (k*64)×128, where k>2.
11. When CTU/CTB size is 256×256, the corresponding IBC virtual buffer may be of size 64×256 to track availability of reference samples, i.e. ibcBufW=64, ibcBufH=256.
    a. In one example, before decoding a VPDU with top-left position (x0, y0), the corresponding VPDU row (0, y0%256) in the IBC buffer will be set to −1.
12. When CTU/CTB size is 256×256, the corresponding IBC virtual buffer may be of size 128×256 to track availability of reference samples, i.e. ibcBufW=128, ibcBufH=256.
    a. In one example, only one VPDU may be kept (excluding the current VPDU) for each VPDU row in the buffer except for a certain VPDU row.
        i. In one example, only one VPDU may be kept (excluding the current VPDU) for each VPDU row in the buffer except for the last VPDU row.

5 Example Implementations of the Disclosed Technology 5.1 Embodiment #1

When CTU size is 256×256, a 64×256 IBC virtual buffer ibcBuf is maintained, i.e. ibcBufW=64, ibcBufH=256. VPDU size is 64×64 and beside the current VPDU, 3 additional VPDU's on-chip memory is used to store IBC reference samples.

The buffer ibcBuf is reset to −1 at the beginning of decoding a CTU row.

At the beginning decoding a new VPDU with top-left position (x0, y0) relative to the top-left corner of the picture, the following applies
   1) For x=x0 . . . x0+63, y=y0 . . . y0+63, ibcBuf[x % ibcBufW][y % ibcBufH]=−1
   2) After decoding a CU, for (x, y) in that CU relative to the top-left corner of the picture, set ibcBuf[x % ibcBufW][y % ibcBufH] as the reconstructed value of sample (x, y) before in-loop filtering, e.g. Sample Adaptive Offset (SAO), deblocking, ALF.
   3) Given a by, the reference for (x, y) is ibcBuf[(x+bv[0]) % ibcBufW][(y+bv[1]) % ibcBufH]

It is a bitstream constraint that the following two conditions shall be true
   1) Given a W×H block with top-left position (x, y) relative the top-left of the picture, (y % ibcBufH)+H<=ibcBufH
   2) ibcBuf[(x+bv[0]) % ibcBufW][(y+bv[1]) % ibcBufH] shall not contain invalid pixel value, e.g. −1, for x=0 . . . W−1, y=0 . . . , H−1

5.2 Embodiment #2

When CTU size is 256×256, a 128×256 IBC virtual buffer ibcBuf is maintained, i.e. ibcBufW=128, ibcBufH=256. VPDU size is 64×64 and beside the current VPDU, 3 additional VPDU's on-chip memory is used to store IBC reference samples.

The buffer ibcBuf is reset to −1 at the beginning of decoding a CTU row. xPrevVPDU=0 and yPrevVPDU=0.

At the beginning decoding a new VPDU with top-left position (x0, y0) relative to the top-left corner of the picture, the following applies
   1) If (yPrevVPDU+64) % ibcBufH is not equal to 0, for x=x0 . . . x0+63, y=y0 . . . y0+63, ibcBuf[(x+xPrevVPDU−64) % ibcBufW][(y+yPrevVPDU) % ibcBufH]=−1
   2) Otherwise ((yPrevVPDU+64) % ibcBufH is equal to 0), for x=x0 . . . x0+63, y=y0 . . . y0+63, ibcBuf[(x+xPrevVPDU) % ibcBufW][(y+yPrevVPDU) % ibcBufH]=−1
   3) xPrevVPDU=x0 and yPrevVPDU=y0

It is a bitstream constraint that the following two conditions shall be true
   1) Given a W×H block with top-left position (x, y) relative the top-left of the picture, (y % ibcBufH)+H<=ibcBufH
   2) ibcBuf[(x+bv[0]) % ibcBufW][(y+bv[1]) % ibcBufH] shall not contain invalid pixel value, e.g. −1, for x=0 . . . W−1, y=0 . . . , H−1

5.3 Embodiment #3

This embodiment reflects bullet 2. Changes, marked in bold faced italics, are based on VVC draft 6 document JVET-O2001-vE.

log 2_min_luma_coding_block_size_minus2 plus 2 specifies the minimum luma coding block size.

The variables CtbLog2SizeY, CtbSizeY, MinCbLog2SizeY, MinCbSizeY, IbcBufWidthY, IbcBufWidthC and Vsize are derived as follows:

$$CtbLog2SizeY = log\ 2\_ctu\_size\_minus5 + 5 \quad (7\text{-}15)$$

$$CtbSizeY = 1 << CtbLog2SizeY \quad (7\text{-}16)$$

$$MinCbLog2SizeY = log\ 2\_min\_luma\_coding\_block\_size\_minus2 + 2 \quad (7\text{-}17)$$

$$MinCbSizeY = 1 << MinCbLog2SizeY \quad (7\text{-}18)$$

$$IbcBufWidthY = 128*128/CtbSizeY + CtbSizeY \quad (7\text{-}19)$$

$$IbcBufWidthC = IbcBufWidthY / SubWidthC \quad (7\text{-}20)$$

$$VSize = Min(64, CtbSizeY) \quad (7\text{-}21)$$

5.4 Embodiment #4

This embodiment reflects bullet 3.

Denote (xCb, yCb) as the top-left position of the current block relative to top-left of the picture.

Block width and height are W and H respectively. Block vector for the block is (xBv, yBv)

Constrain of VPDU row relative to the picture:
   It is a bitstream constraint that (xCb+xBv)/vSize shall be equal to (xCb+xBv+W−1/vSize).

Constrain of VPDU column relative to the picture:
   It is a bitstream constraint that (yCb+yBv)/vSize shall be equal to (yCb+yBv+H−1/vSize).

Constrain of VPDU row relative to the IBC buffer:
It is a bitstream constraint that ((xCb+xBv) % IbcBufWidthY)/vSize shall be equal to (((xCb+xBv+W−1) % IbcBufWidthY)/vSize).
Constrain of VPDU column relative to the IBC buffer:
It is a bitstream constraint that ((yCb+yBv) % IbcBufHeightY)/vSize shall be equal to (((yCb+yBv+H−1) % IbcBufHeightY)/vSize).

Figure 4:
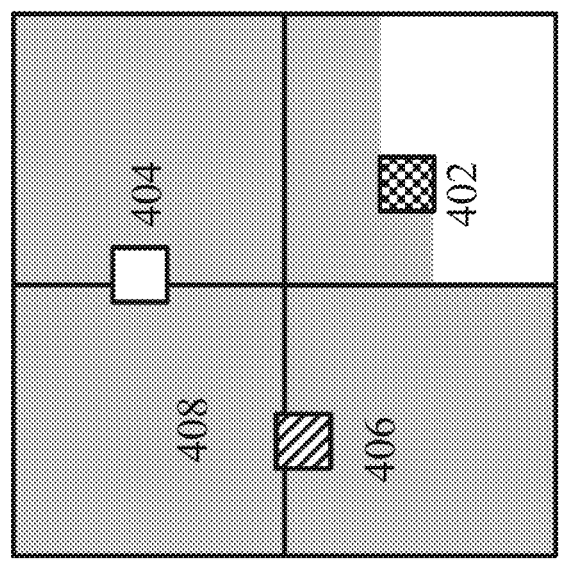
FIG. 4 shows examples of reference blocks crossing VPDU column and VPDU row.

FIG. 4 shows examples of reference blocks crossing VPDU column and VPDU row. As shown in FIG. 4, for a current CU (checkered block 402), a block (unpatterned block 404) is an crossing VPDU column reference block and a block (diagonally striped block 406) is an crossing VPDU row reference block. Each large block indicates a 64×64 VPDU and green area (608) indicated reconstrued pixels that can be used for IBC reference.

The examples described above may be incorporated in the context of the methods described below, e.g., method 500, 520 or 540, which may be implemented at a video decoder or a video encoder.

FIG. 5A shows a flowchart of an exemplary method 500 for video processing. The method 500 includes, at step 502, making a decision, based on a size of a virtual buffer associated with a current block that is coded based on pixels in a reference block, regarding a validity of a block vector or one or more samples mapped to the virtual buffer, a current picture comprising the current block and the reference block, and the size of the virtual buffer being based on a size of a virtual pipeline data unit (VPDU), a size of a coding tree block (CTB) size or a size of a coding tree unit (CTU).

The method 500 includes, at step 504, performing, based on the decision, a conversion between the current block and a bitstream representation of the current block.

FIG. 5B shows a flowchart of an exemplary method 520 for video processing. The method 520 includes, at step 522, designating, for a current block that is coded based on pixels in a reference block, one or more reference samples of the reference block as unavailable, each of the one or more reference samples being mapped to a virtual buffer and having a corresponding sample in at least a current virtual pipeline data unit (VPDU) associated with the reference block, and a current picture comprising the current block and the reference block.

The method 520 includes, at step 524, performing, based on the designating, a conversion between the current block and a bitstream representation of the current block.

Figure 5C:
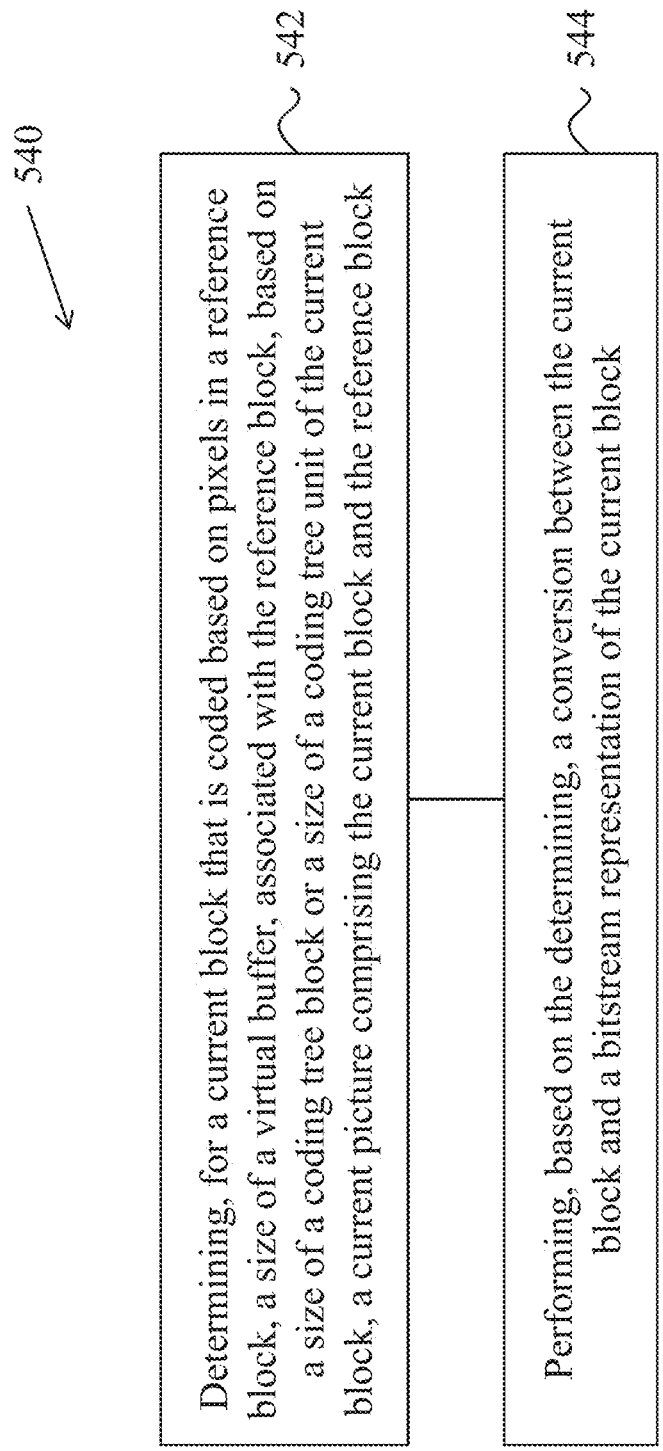

FIG. 5C shows a flowchart of an exemplary method 540 for video processing. The method 540 includes, at step 542, determining, for a current block that is coded based on pixels in a reference block, a size of a virtual buffer, associated with the reference block, based on a size of a coding tree block (CTB) or a size of a coding tree unit (CTU) of the current block, a current picture comprising the current block and the reference block.

The method 540 includes, at step 544, performing, based on the determining, a conversion between the current block and a bitstream representation of the current block.

Figure 6:
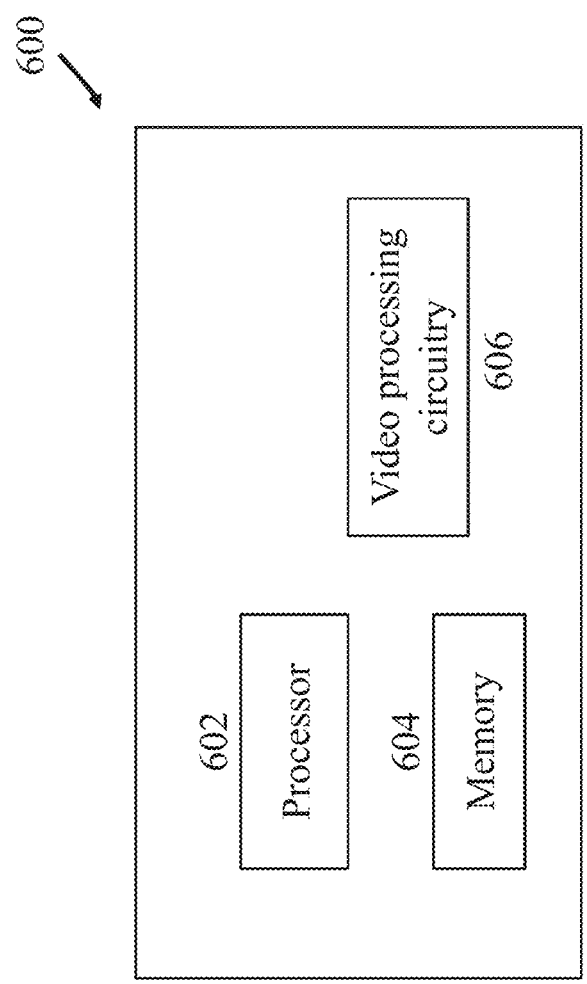
FIG. 6 is a block diagram of an example of a hardware platform for implementing a visual media decoding or a visual media encoding technique described in the present document.

FIG. 6 is a block diagram of a video processing apparatus 600. The apparatus 600 may be used to implement one or more of the methods described herein. The apparatus 600 may be embodied in a smartphone, tablet, computer, Internet of Things (IoT) receiver, and so on. The apparatus 600 may include one or more processors 602, one or more memories 604 and video processing hardware 606. The processor(s) 602 may be configured to implement one or more methods (including, but not limited to, method 400) described in the present document. The memory (memories) 604 may be used for storing data and code used for implementing the methods and techniques described herein. The video processing hardware 606 may be used to implement, in hardware circuitry, some techniques described in the present document. In some embodiments, the hardware 606 may be at least partially within the processor 602, e.g., a graphics co-processor.

Figure 7:
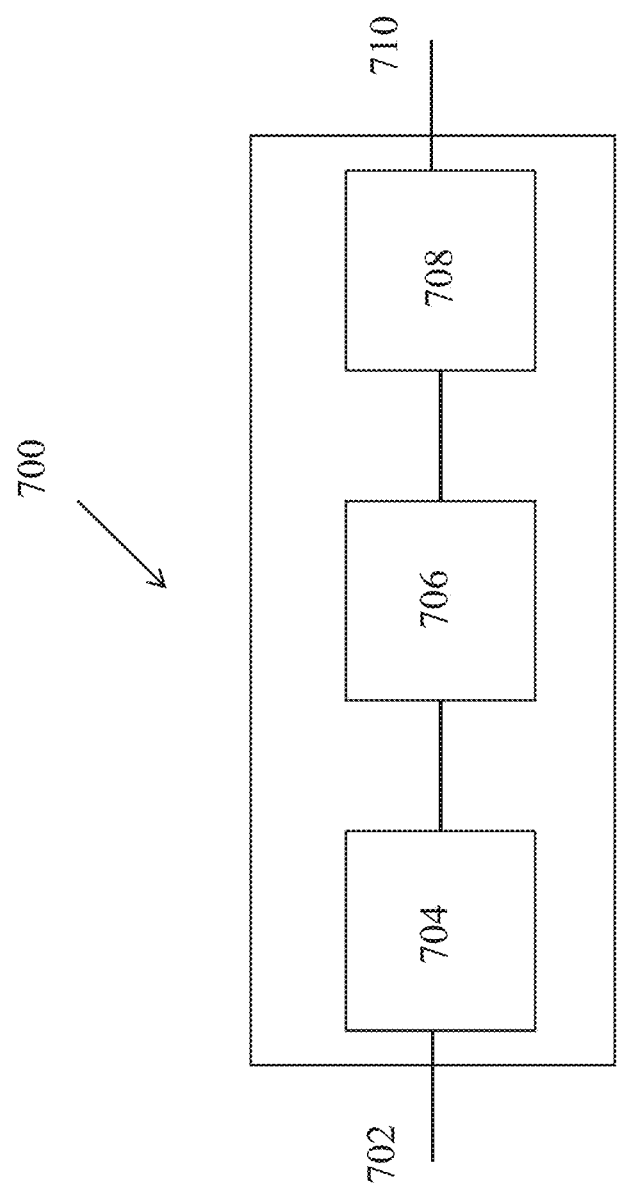
FIG. 7 is a block diagram of an example video processing system in which disclosed techniques may be implemented.

FIG. 7 is a block diagram showing an example video processing system 700 in which various techniques disclosed herein may be implemented. Various implementations may include some or all of the components of the system 700. The system 700 may include input 702 for receiving video content. The video content may be received in a raw or uncompressed format, e.g., 8 or 10 bit multi-component pixel values, or may be in a compressed or encoded format. The input 702 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 700 may include a coding component 704 that may implement the various coding or encoding methods described in the present document. The coding component 704 may reduce the average bitrate of video from the input 702 to the output of the coding component 704 to produce a coded representation of the video. The coding techniques are therefore sometimes called video compression or video transcoding techniques. The output of the coding component 704 may be either stored, or transmitted via a communication connected, as represented by the component 706. The stored or communicated bitstream (or coded) representation of the video received at the input 702 may be used by the component 708 for generating pixel values or displayable video that is sent to a display interface 710. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present document may be embodied in various electronic devices such as mobile phones, laptops, smartphones or other devices that are capable of performing digital data processing and/or video display.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was disabled based on the decision or determination.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

The first set of following clauses may be implemented together with additional techniques described in items listed in the previous section.

1. A method for video processing, comprising: making a decision, based on a size of a virtual buffer associated with a current block that is coded based on pixels in a reference block, regarding a validity of a block vector or one or more samples mapped to the virtual buffer, wherein a current picture comprises the current block and the reference block, and wherein the size of the virtual buffer is based on a size of a virtual pipeline data unit (VPDU), a size of a coding tree block (CTB) size or a size of a coding tree unit (CTU); and performing, based on the decision, a conversion between the current block and a bitstream representation of the current block.

2. The method of clause 1, wherein a product of a height and a width of the virtual buffer is fixed, and wherein the height or the width is based on the size of the VPDU, the size of the CTB or the size of the CTU.

3. The method of clause 1, wherein a width of the virtual buffer is equal to a width of the CTB or a width of the CTU.

4. The method of clause 1, wherein a width or a height of the virtual buffer is N times a width or a height of the VPDU, respectively, and wherein N>1 is an integer.

5. The method of clause 1, wherein a maximum number of the one or more samples is less than the size of the virtual buffer.

6. The method of clause 1, wherein a maximum number of the one or more samples is fixed upon a determination that the size of the CTB or the size of the CTU is larger than 64×64.

7. The method of clause 1, wherein a number of the one or more samples is less than or equal to N times a number of samples in the VPDU, and wherein N>1 is an integer.

8. The method of clause 7, wherein N=3 upon a determination that the size of the CTB or the size of the CTU is larger than 64×64.

9. A method for video processing, comprising: designating, for a current block that is coded based on pixels in a reference block, one or more reference samples of the reference block as unavailable, wherein each of the one or more reference samples is mapped to a virtual buffer and has a corresponding sample in at least a current virtual pipeline data unit (VPDU) associated with the reference block, and wherein a current picture comprises the current block and the reference block; and performing, based on the designating, a conversion between the current block and a bitstream representation of the current block.

10. The method of clause 9, further comprising: designating the corresponding sample in the current VPDU as unavailable.

11. The method of clause 10, wherein the designating the corresponding sample is based on a position of the current VPDU.

12. The method of clause 10, wherein the designating the corresponding sample is based on a position of a previous VPDU or a recently decoded VPDU.

13. The method of clause 9, wherein each of the one or more reference samples has a corresponding sample in each of three most recently decoded VPDUs.

14. A method for video processing, comprising: determining, for a current block that is coded based on pixels in a reference block, a size of a virtual buffer, associated with the reference block, based on a size of a coding tree block (CTB) or a size of a coding tree unit (CTU) of the current block, wherein a current picture comprises the current block and the reference block; and performing, based on the determining, a conversion between the current block and a bitstream representation of the current block.

15. The method of clause 14, wherein the size of the virtual buffer is 256×128 upon a determination that the size of the CTB or the CTU is 128×128.

16. The method of clause 14, wherein the size of the virtual buffer is 64×256 upon a determination that the size of the CTB or the CTU is 256×256.

17. The method of clause 14, wherein the size of the virtual buffer is 128×256 upon a determination that the size of the CTB or the CTU is 256×256.

18. The method of any of clauses 1 to 17, wherein coding the current block based on the pixels in the reference block in the current picture that comprises the current block is an intra block copy (IBC) operation, and wherein the virtual buffer is an IBC virtual buffer.

19. A method of video processing, comprising: allocating, for a conversion between a bitstream representation of a current block of video and the current block, an intra block coding (IBC) virtual buffer size that is greater than a minimum size of a block vector search area for the conversion; and performing the conversion based on the allocating.

20. The method of clause 19, wherein the IBC buffer size is larger than a total size of a virtual pipeline data unit memory used for the conversion.

21. The method of any of clauses 19-20, wherein a width of the IBC virtual buffer size is (128*128/ctbSizeY+ctbSizeY).

22. A method of video processing, comprising: determining, for a conversion between a bitstream representation of a current block of video and the current block, a size of a reference block for the conversion based on an intra block prediction coding based on a rule; and performing the conversion based on the determining; wherein the rule constraints the reference block to be within a virtual pipeline data unit (VPDU) column or a virtual pipeline data unit row.

23. The method of clause 22, wherein the rule disallows the reference block to be across different VPDU rows.

24. The method of clause 22, wherein the rule disallows the reference block to be across different VPDU columns.

25. The method of any of clauses 22-24, wherein the VPDU column or the VPDU row are relative to a picture that contains the current block.

26. The method of any of clauses 22-24, wherein the VPDU column or the VPDU row are relative to in intra block copy virtual buffer.

27. The method of any of clauses 1-26, wherein the conversion comprises video coding to generate the bitstream representation from the current block.

28. The method of any of clauses 1-26, wherein the conversion comprises video decoding to generate the current block from the bitstream representation.

29. An apparatus in a video system comprising a processor and a non-transitory memory with instructions thereon, wherein the instructions upon execution by the processor, cause the processor to implement the method in any one of clauses 1 to 28.

30. A computer program product stored on a non-transitory computer readable media, the computer program product including program code for carrying out the method in any one of clauses 1 to 28.

31. A method, apparatus or system described herein.

The second set of following clauses may be implemented together with additional techniques described in items listed in the previous section (e.g., embodiment items 2-5).

Figure 8A:
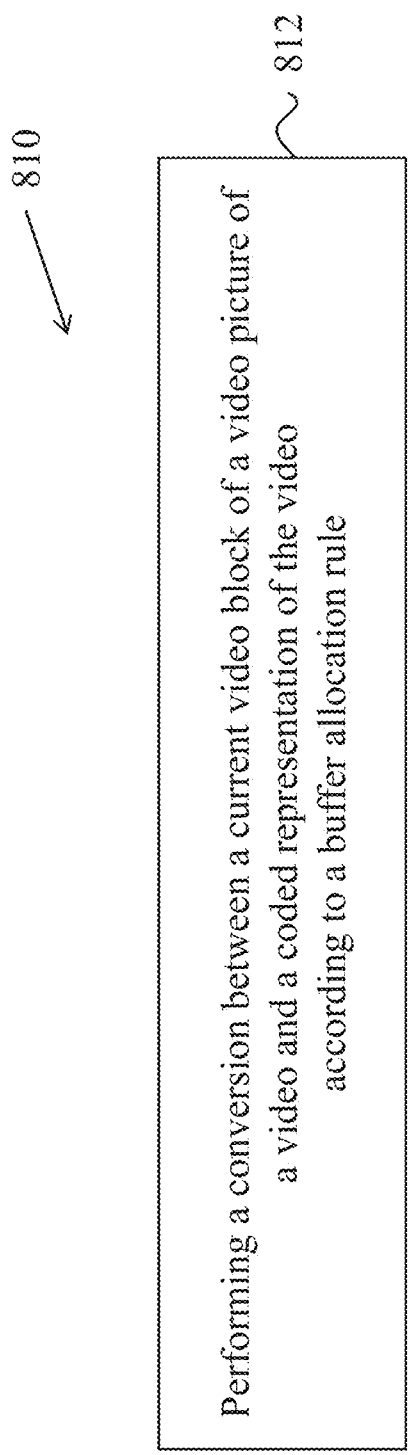
FIGS. 8A to 8C are block diagrams of examples of a hardware platform based on some implementations of the disclosed technology.

1. A method of video processing (e.g., a method 810 shown in FIG. 8A), comprising: performing (812) a conversion between a current video block of a video picture of a video and a coded representation of the video according to a buffer allocation rule, wherein the conversion uses an intra block copy (IBC) mode in which a prediction of the current video block is derived based on sample values from a same video slice with the current video block, and wherein the sample values are determined by block vectors; wherein the buffer allocation rule specifies that a virtual buffer allocated for the conversion using the IBC mode is greater than a minimum size of memory for storing a portion of the video picture searched for determining the block vectors.

2. The method of clause 1, wherein the buffer allocation rule further specifies that the virtual buffer is greater than a total size of a virtual pipeline data unit (VPDU) memory used for the conversion.

3. The method of clause 2, wherein the buffer allocation rule further specifies that the virtual buffer has a size sufficient to store motion information of another video block.

4. The method of clause 1 or 2, wherein a width of the virtual buffer is (128*128/ctbSizeY+ctbSizeY), whereby ctbSizeY is a size of a luma coding tree unit or a luma coding tree block.

5. The method of clause 1 or 2, wherein a height of the virtual buffer is ctbSizeY, whereby ctbSizeY is a size of a luma coding tree unit or a luma coding tree block.

Figure 8B:
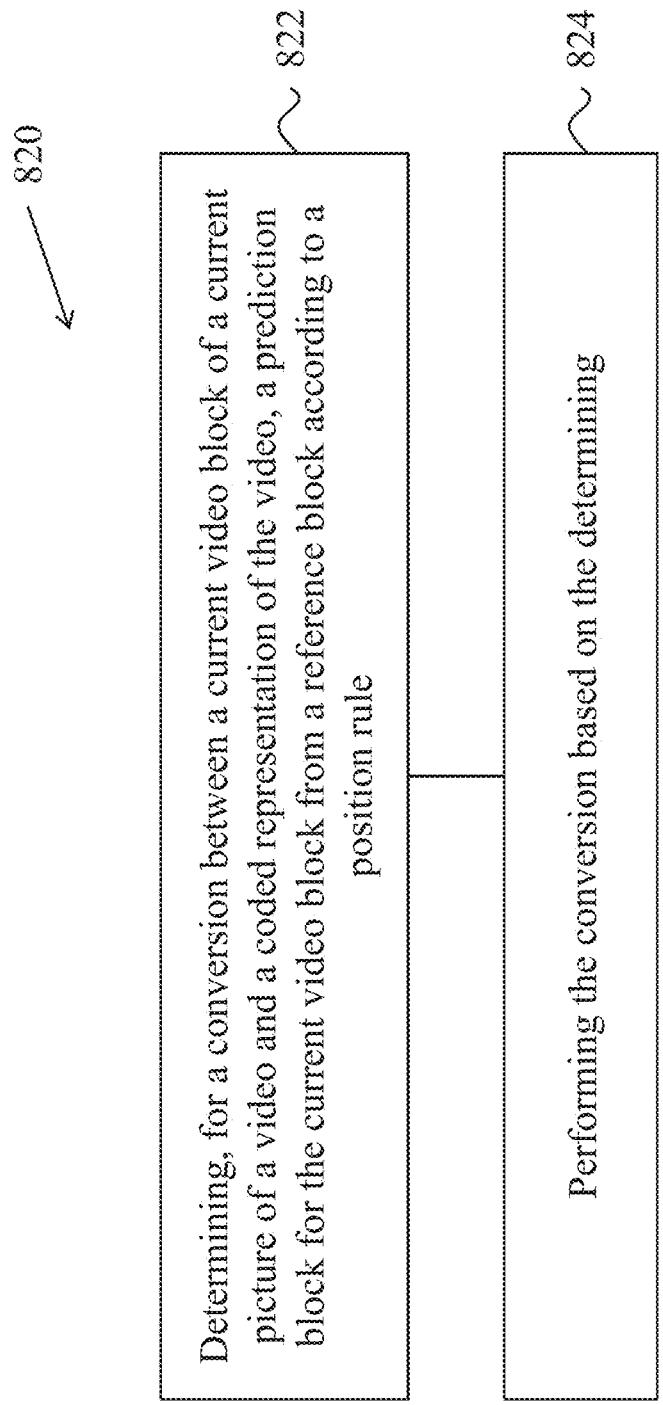

6. A method of video processing (e.g., a method 820 shown in FIG. 8B), comprising: determining (822), for a conversion between a current video block of a current picture of a video and a coded representation of the video, a prediction block for the current video block from a reference block according to a position rule; and performing (824) the conversion based on the determining; wherein the position rule specifies an allowable position of the reference block with respect to a virtual pipeline data unit (VPDU) row or a VPDU column of the current picture.

7. The method of clause 6, wherein the position rule further specifies that the reference block is constrained to be within the VPDU row or the VPDU column.

8. The method of clause 7, wherein the position rule further specifies that the reference block is disallowed to cross different rows or different columns of the VPDU.

9. The method of any of clauses 6 to 8, wherein the position rule specifies the VPDU row or the VPDU column relative to the current picture.

10. The method of any of clauses 6 to 8, wherein the position rule specifies that the VPDU row or the VPDU column is relative to an IBC virtual buffer allocated for the conversion.

11. The method of clause 6, wherein the determining is invoked in case that the reference block cross two or more coding tree units and/or two or more coding tree blocks.

12. The method of clause 6, wherein the position rule further specifies that the reference block is allowed to cross different VPDU rows or different VPDU columns.

13. The method of clause 12, wherein, in case that the reference block is allowed to cross different VPDU rows or different VPDU columns, some prediction values to predict the current video block are obtained from an additional operation.

14. The method of clause 12, wherein, in case that that the reference block is allowed to cross different VPDU rows or different VPDU columns, some prediction values to predict the current video block are obtained using default values.

Figure 8C:
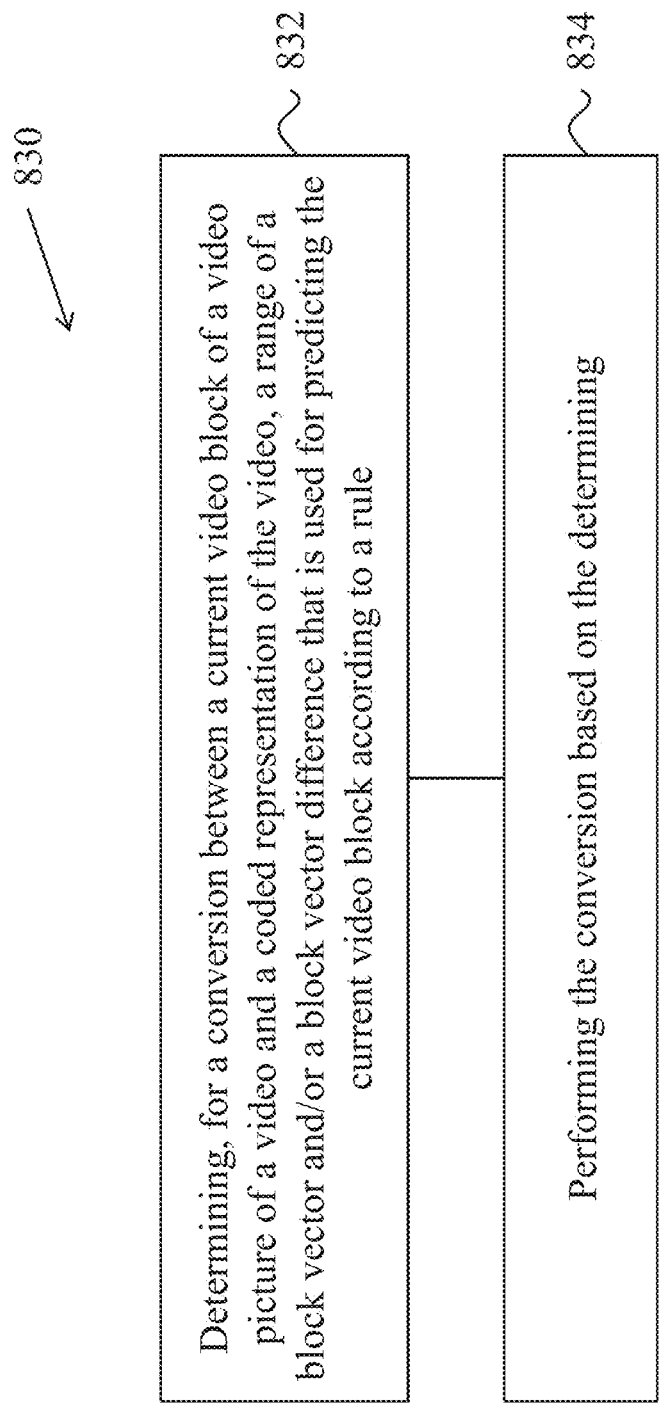

15. A method of video processing (e.g., a method 830 shown in FIG. 8C), comprising: determining (832), for a conversion between a current video block of a video picture of a video and a coded representation of the video, a range of a block vector and/or a block vector difference that is used for predicting the current video block according to a rule; and performing (834) the conversion based on the decision, wherein the block vector indicates a displacement between the current video block and a reference region in the video picture used for predictively coding the current video block.

16. The method of clause 15, wherein the rule is dependent on a location of the current video block within a coding tree unit or a coding tree block including the current video block.

17. The method of clause 15, wherein the rule specifies that the block vector is in the range of of $[-2^m, 2^m-1]$, whereby m is an integer.

18. The method of clause 17, wherein m is 15 or 17 or 18.

19. The method of clause 15, wherein the rule specifies that the block vector difference is in the range of $[-2^n, 2^n-1]$, whereby n is an integer.

20. The method of clause 19, wherein the block vector difference is included in the coded representation.

21. The method of clause 15, wherein the rule specifies that the block vector difference is in the range of $[-2^n+1, 2^n-1]$, whereby n is an integer.

22. The method of clause 21, wherein the block vector difference is included in the coded representation.

23. The method of any of clauses 19 to 22, wherein n is 14 or 16 or 17.

24. The method of clause 17 or 18, wherein m depends on i) a precision for the block vector or a motion vector storage and/or ii) a precision associated with the block vector difference.

25. The method of any of clauses 19 to 23, wherein n depends on i) a precision for the block vector or a motion vector storage and/or ii) a precision associated with the block vector difference.

26. The method of clause 15, wherein the rule specifies that the range of the block vector is same as that of a motion vector used for another video block coded using an inter prediction mode.

27. The method of clause 15, wherein the rule specifies that the range of the block vector difference is same as that of a motion vector used for another video block coded using an inter prediction mode.

28. The method of any of clauses 16 to 27, wherein a conformance bitstream satisfies the rule.

29. The method of clause 15, wherein the determining the range includes performing a clipping process to the block vector and/or the block vector difference.

30. The method of any of clauses 1 to 29, wherein the conversion includes encoding the video into the coded representation.

31. The method of any of clauses 1 to 29, wherein the conversion includes decoding the coded representation to generate the video.

32. A video processing apparatus comprising a processor configured to implement a method recited in any one or more of clauses 1 to 31.

33. A computer readable medium storing program code that, when executed, causes a processor to implement a method recited in any one or more of clauses 1 to 31.

34. A computer readable medium that stores a coded representation or a bitstream representation generated according to any of the above described methods.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., erasable programmable read-only memory (EPROM), electrically erasable programmable read-only memory (EEPROM), and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
   determining, for a conversion between a current video block of a video picture and a bitstream of the video picture, a prediction mode being applied to the current video block;
   determining a block vector of the current video block based on the prediction mode;
   maintaining a virtual buffer comprising reference samples derived from blocks of sample values of the video picture;
   deriving, in the prediction mode, prediction samples of the current video block based on the block vector and the virtual buffer; and performing the conversion based on the prediction samples,
wherein a width of the virtual buffer is one or multiple times of a width of a virtual unit, and the width of the virtual unit is min (ctbSizeY, 64), where ctbSizeY denotes a size of a luma CTB comprising the current video block, and wherein a height of the virtual buffer is one or multiple times of a height of the virtual unit, and the height of the virtual unit is min (ctbSizeY, 64),
wherein locations of one or more unavailable samples in the virtual buffer for deriving the prediction samples are determined based on the width of the virtual unit and the height of the virtual unit, and
wherein a maximum number of available reference samples in the virtual buffer is less than a size of the virtual buffer.

2. The method of claim 1, wherein the block vector is constrained in a range of $[-2^m, 2^m-1]$, wherein m is an integer.

3. The method of claim 1, wherein the virtual buffer is reset before processing a coding tree unit (CTU) row.

4. The method of claim 3, wherein the reference samples in the virtual buffer are reset to be −1.

5. The method of claim 1, wherein when a size of a coding tree block is 128, the size of the virtual buffer is equal to a size of two coding tree blocks.

6. The method of claim 1, wherein the conversion comprises encoding the video picture into the bitstream.

7. The method of claim 1, wherein the conversion comprises decoding the video picture from the bitstream.

8. An apparatus for processing video data comprising a processor and a non-transitory memory with instructions thereon, wherein the instructions upon execution by the processor, cause the processor to:
determine, for a conversion between a current video block of a video picture and a bitstream of the video picture, a prediction mode being applied to the current video block;
determine a block vector of the current video block based on the prediction mode;
maintain a virtual buffer comprising reference samples derived from blocks of sample values of the video picture;
derive, in the prediction mode, prediction samples of the current video block based on the block vector and the virtual buffer; and
perform the conversion based on the prediction samples,
wherein a width of the virtual buffer is one or multiple times of a width of a virtual unit, and the width of the virtual unit is min (ctbSizeY, 64), where ctbSizeY denotes a size of a luma CTB comprising the current video block, and wherein a height of the virtual buffer is one or multiple times of a height of the virtual unit, and the height of the virtual unit is min (ctbSizeY, 64),
wherein locations of one or more unavailable samples in the virtual buffer for deriving the prediction samples are determined based on the width of the virtual unit and the height of the virtual unit, and
wherein a maximum number of available reference samples in the virtual buffer is less than a size of the virtual buffer.

9. The apparatus of claim 8, wherein the block vector is constrained in a range of $[-2^m, 2^m-1]$, wherein m is an integer.

10. A non-transitory computer-readable storage medium storing instructions that cause a processor to:
determine, for a conversion between a current video block of a video picture and a bitstream of the video picture, a prediction mode being applied to the current video block;
determine a block vector of the current video block based on the prediction mode;
maintain a virtual buffer comprising reference samples derived from blocks of sample values of the video picture;
derive, in the prediction mode, prediction samples of the current video block based on the block vector and the virtual buffer; and
perform the conversion based on the prediction samples,
wherein a width of the virtual buffer is one or multiple times of a width of a virtual unit, and the width of the virtual unit is min (ctbSizeY, 64), where ctbSizeY denotes a size of a luma CTB comprising the current video block, and wherein a height of the virtual buffer is one or multiple times of a height of the virtual unit, and the height of the virtual unit is min (ctbSizeY, 64),
wherein locations of one or more unavailable samples in the virtual buffer for deriving the prediction samples are determined based on the width of the virtual unit and the height of the virtual unit, and
wherein a maximum number of available reference samples in the virtual buffer is less than a size of the virtual buffer.

11. The non-transitory computer-readable storage medium of claim 10, wherein the block vector is constrained in a range of $[-2^m, 2^m-1]$, wherein m is an integer.

12. A non-transitory computer-readable recording medium storing a bitstream of a video which is generated by a method performed by a video processing apparatus, wherein the method comprises:
determining, for a current video block of a video picture, a prediction mode being applied to the current video block;
determining a block vector of the current video block based on the prediction mode;
maintaining a virtual buffer comprising reference samples derived from blocks of sample values of the video picture;
deriving, in the prediction mode, prediction samples of the current video block based on the block vector and the virtual buffer; and
generating the bitstream based on the prediction samples,
wherein a width of the virtual buffer is one or multiple times of a width of a virtual unit, and the width of the virtual unit is min (ctbSizeY, 64), where ctbSizeY denotes a size of a luma CTB comprising the current video block, and wherein a height of the virtual buffer is one or multiple times of a height of the virtual unit, and the height of the virtual unit is min (ctbSizeY, 64),
wherein locations of one or more unavailable samples in the virtual buffer for deriving the prediction samples are determined based on the width of the virtual unit and the height of the virtual unit, and
wherein a maximum number of available reference samples in the virtual buffer is less than a size of the virtual buffer.

13. The non-transitory computer-readable recording medium of claim 12, wherein the block vector is constrained in a range of $[-2^m, 2^m-1]$, wherein m is an integer.

14. The method of claim 1, wherein the prediction mode is an intra block copy (IBC) mode and the virtual buffer is an IBC virtual buffer.

15. The method of claim 1, wherein a bitstream conformance constraint satisfied by the bitstream comprises that a reference block determined by the block vector pointed to the reference samples in the virtual buffer do not have values equal to −1.

16. The method of claim 1, wherein at beginning of decoding each CTU row, values of references samples in the virtual buffer are reset to −1.

17. The method of claim 1, wherein a product of the height and the width of the virtual buffer is fixed, and the width of the virtual buffer is determined based on the size of the CTB.

18. The method of claim 1, wherein an area of the virtual buffer is 256*128.

19. The apparatus of claim 8, wherein the prediction mode is an intra block copy (IBC) mode and the virtual buffer is an IBC virtual buffer.

20. The non-transitory computer-readable storage medium of claim 10, wherein the prediction mode is an intra block copy (IBC) mode and the virtual buffer is an IBC virtual buffer.

* * * * *